US009696866B2

(12) United States Patent
Liang et al.

(10) Patent No.: US 9,696,866 B2
(45) Date of Patent: Jul. 4, 2017

(54) REMOTE WIRELESS SCREEN SHARING METHOD, DEVICE AND SYSTEM

(71) Applicant: ZTE CORPORATION, Shenzhen, Guangdong Province (CN)

(72) Inventors: Jiehui Liang, Shenzhen (CN); Fajie Zhao, Shenzhen (CN); Yushen Zhou, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/907,116

(22) PCT Filed: Sep. 27, 2013

(86) PCT No.: PCT/CN2013/084515
§ 371 (c)(1),
(2) Date: Jan. 22, 2016

(87) PCT Pub. No.: WO2014/169581
PCT Pub. Date: Oct. 23, 2014

(65) Prior Publication Data
US 2016/0179295 A1     Jun. 23, 2016

(30) Foreign Application Priority Data
Aug. 29, 2013   (CN) .......................... 2013 1 0386058

(51) Int. Cl.
G06F 15/16      (2006.01)
G06F 3/0481     (2013.01)
(Continued)

(52) U.S. Cl.
CPC ............. *G06F 3/0481* (2013.01); *G06F 3/00* (2013.01); *G06F 3/14* (2013.01); *G06Q 10/10* (2013.01);
(Continued)

(58) Field of Classification Search
USPC .................... 709/204, 205, 227, 228, 229
See application file for complete search history.

(56) References Cited

U.S. PATENT DOCUMENTS 6,390,371 B1 * 5/2002 Armga ................ G06F 3/1431
235/472.01
2012/0173622 A1 * 7/2012 Toledano ............ H04L 65/1089
709/204

(Continued)

FOREIGN PATENT DOCUMENTS

| CN | 1811695 A | 8/2006 |
| CN | 101237327 A | 8/2008 |
| CN | 102883135 A | 1/2013 |

OTHER PUBLICATIONS

International Search Report (Form PCT/ISA/210) for International Application No. PCT/CN2013/084515.
(Continued)

*Primary Examiner* — Liangche A Wang
(74) *Attorney, Agent, or Firm* — Koppel, Patrick, Heybl & Philpott

(57) ABSTRACT

Provided are a remote screen sharing method, device and system. The method includes: establishing a wireless screen sharing session with sink equipment, and acquiring capability information of the sink equipment; establishing a connection with remote equipment, and acquiring capability information of the remote equipment and network information of the remote equipment; determining an intersection of display capabilities of the sink equipment and the remote equipment according to the capability information of the sink equipment, the capability information of the remote equipment and the network information of the remote equipment; and receiving a screen content of the sink equipment via the wireless screen sharing session, and sharing the screen content of the sink equipment to the remote equip-
(Continued)

ment according to the intersection of the display capabilities. The problem of poor compatibility during remote screen sharing is solved, and the effect of improving equipment compatibility during remote screen sharing is achieved.

20 Claims, 4 Drawing Sheets

(51) Int. Cl.
    *H04L 29/08*     (2006.01)
    *G06Q 10/10*     (2012.01)
    *H04L 12/18*     (2006.01)
    *G06F 3/00*     (2006.01)
    *H04L 29/06*     (2006.01)
    *G06F 3/14*     (2006.01)
    *H04W 8/22*     (2009.01)
    *H04W 76/02*     (2009.01)

(52) U.S. Cl.
    CPC .......... *H04L 12/18* (2013.01); *H04L 12/1827* (2013.01); *H04L 65/1069* (2013.01); *H04L 65/1086* (2013.01); *H04L 67/04* (2013.01); *H04L 67/14* (2013.01); *H04L 67/148* (2013.01); *H04L 67/303* (2013.01); *H04L 67/38* (2013.01); *H04L 69/24* (2013.01); *H04W 8/22* (2013.01); *H04W 76/02* (2013.01)

(56) References Cited

U.S. PATENT DOCUMENTS

| | | | |
|---|---|---|---|
| 2013/0022100 A1* | 1/2013 | Liao | H04L 65/1069 375/240.01 |
| 2013/0328746 A1* | 12/2013 | Fujita | G06F 3/1454 345/2.2 |
| 2014/0043431 A1* | 2/2014 | Kato | H04N 7/147 348/14.12 |

OTHER PUBLICATIONS

Article from "Wifi Alliance" titled "Wi-Fi Certified Miracast™ Extending the Wi-Fi Experience to Seamless Video Display", Internet Citation, dated Sep. 19, 2012 pp. 1-18. XP002700078, retrieved from the Internet.

Article from "Wifi Alliance" titled "Wi-Fi Peer-to-Peer (P2P) Technical Specification v1.2".—Wi-Fi Peer-to-Peer (P2P) Specification VI.2, Wi-Fi Alliance, US, vol. V1.2 dated Dec. 14, 2011. pp. 1-159. XP008165048, retrieved from the Internet.

European Search Report Reference No. BNT220601EPPC, Application No./U.S. Pat. No. 13882436.2-1853/3041183 PCT/CN2013084515, dated Feb. 8, 2016.

* cited by examiner

REMOTE WIRELESS SCREEN SHARING METHOD, DEVICE AND SYSTEM

TECHNICAL FIELD

The present disclosure relates to the field of communication, and in particular to a remote wireless screen sharing (e.g., Miracast) method, device and system.

BACKGROUND

The Wireless Fidelity (WIFI) Alliance starts Wireless screen Sharing (e.g., Miracast) certification on the basis of WIFI display standard in September, 2012. Equipment compatible with Miracast can seamlessly share a screen content without the limitation of an application program and a media content format on the equipment.

A Miracast technology adopts WIFI direct connection, and two equipment types are required: source equipment and sink equipment, which limits that only Miracast between two pieces of equipment is permitted and defines that the distance between the two pieces of equipment is required to be within a hundred meters because a coverage of WIFI direct connection is about 100 meters.

Miracast supports display resolutions ranged from 640*360 to 192*1080 and frame rates ranged from 30 frames/second to 60 frames/second, supports videos of two profiles, i.e. Constrained Baseline Profile (CBP) and Constrained High Profile (CHP), of H264 coding of the International Telecommunication Union-Telecommunication standardization sector (ITU-T), from level 3.1 to 4.2, mandatorily supports audios of two-channel 16-bit 48 kHZ sampling Linear Pulse-Code Modulation (LPCM) coding, and optionally supports Advanced Audio Coding (AAC) and Audio Coding-3 (AC3).

Extensible Messaging and Presence Protocol (XMPP) is an Extensible Markup Language (XML)-protocol-based open communication protocol, and is mainly used for instant messaging, presence information notification, contact list management, event publication and subscription, real-time voice communication, real-time video communication and file transmission. The XMPP may be combined with an Interactive Connectivity Establishment (ICE) mechanism to perform effective network detection and perform Peer-to-Peer (P2P) transmission in an address and port unconstrained network.

In a related technology, due to the existence of a problem in compatibility of equipment, a screenshot-based picture compression manner is usually adopted in remote wireless screen sharing, and it is impossible to provide a stream-oriented wireless screen sharing function similar to Miracast.

For the problem of poor equipment compatibility during remote wireless screen sharing in the related technology, there is yet no effective solution.

SUMMARY

The embodiments of the present disclosure provide a remote wireless screen sharing method, device and system, so as to solve the abovementioned problem.

According to one aspect of the embodiments of the present disclosure, a remote wireless screen sharing method is provided, which includes: establishing a wireless screen sharing session with sink equipment, and acquiring capability information of the sink equipment; establishing a connection with remote equipment, and acquiring capability information of the remote equipment and network information of the remote equipment; determining an intersection of display capabilities of the sink equipment and the remote equipment according to the capability information of the sink equipment, the capability information of the remote equipment and the network information of the remote equipment; and receiving a screen content of the sink equipment via the wireless screen sharing session, and sharing the screen content of the sink equipment to the remote equipment according to the intersection of the display capabilities.

In an example embodiment, receiving the screen content of the sink equipment via the wireless screen sharing session, and sharing the screen content of the sink equipment to the remote equipment according to the intersection of the display capabilities includes: receiving the screen content, sent by the sink equipment via the wireless screen sharing session, of the sink equipment; and processing the screen content of the sink equipment according to the intersection of the display capabilities, and sending the processed screen content of the sink equipment to the remote equipment.

In an example embodiment, the capability information of the sink equipment or the capability information of the remote equipment or the intersection of the display capabilities includes at least one of: video information and an audio coding format, wherein the video information includes a video coding format and/or a maximum resolution.

In an example embodiment, the network information includes at least one of: a network connection type and a bandwidth, wherein the network connection type includes a Peer-to-Peer connection (P2P) manner, a Session Traversal Utilities for Network Address Translation (STUN) manner or a Traversal using Relay NAT (TURN) manner.

In an example embodiment, determining the intersection of the display capabilities of the sink equipment and the remote equipment according to the capability information of the sink equipment, the capability information of the remote equipment and the network information of the remote equipment includes at least one of the following: under a condition that the network connection type is the P2P manner, selecting an audio format of which a compression ratio is greater than a first compression ratio threshold as an audio coding format of the intersection of the display capabilities and selecting a resolution which is greater than a first resolution threshold as a resolution of the intersection of the display capabilities according to the capability information of the sink equipment and the capability information of the remote equipment; under a condition that the network connection type is the STUN manner, selecting an audio format of which a compression ratio is smaller than the first compression ratio threshold and greater than a second compression ratio threshold as the audio coding format of the intersection of the display capabilities and selecting a resolution which is smaller than the first resolution threshold and greater than a second resolution threshold as the resolution of the intersection of the display capabilities according to the capability information of the sink equipment and the capability information of the remote equipment; and under a condition that the network connection type is the TURN manner, selecting an audio format of which a compression ratio is smaller than the second compression ratio threshold as the audio coding format of the intersection of the display capabilities and selecting a resolution which is smaller than the second resolution threshold as the resolution of the intersection of the display capabilities according to the capability information of the sink equipment and the capability information of the remote equipment.

In an example embodiment, determining the intersection of the display capabilities of the sink equipment and the remote equipment according to the capability information of the sink equipment, the capability information of the remote equipment and the network information of the remote equipment further includes at least one of the following: under a condition that the bandwidth is greater than a first bandwidth threshold, selecting a CHP as a video coding format of the intersection of the display capabilities; and under a condition that the bandwidth is smaller than the first bandwidth threshold, selecting a CBP as the video coding format of the intersection of the display capabilities.

In an example embodiment, determining the intersection of the display capabilities of the sink equipment and the remote equipment according to the capability information of the sink equipment, the capability information of the remote equipment and the network information of the remote equipment includes: under a condition that the capability information of the sink equipment does not intersect the capability information of the remote equipment, acquiring an intersection of display capabilities of current equipment itself and the sink equipment, and employing the intersection of the display capabilities of the current equipment itself and the sink equipment as the intersection of the display capabilities of the sink equipment and the remote equipment.

In an example embodiment, establishing the connection with the remote equipment via XMPP includes: accessing an XMPP server via a first access point, wherein the first access point accesses the XMPP server via XMPP; and establishing the connection with the remote equipment via the XMPP server.

In an example embodiment, the wireless screen sharing session is a Miracast session.

According to another aspect of the embodiments of the present disclosure, a remote wireless screen sharing device is provided, which includes: an acquisition component, configured to establish a wireless screen sharing session with sink equipment, and acquiring capability information of the sink equipment, and establish a connection with remote equipment, and acquiring capability information of the remote equipment and network information of the remote equipment; a determination component, configured to determine an intersection of display capabilities of the sink equipment and the remote equipment according to the capability information of the sink equipment, the capability information of the remote equipment and the network information of the remote equipment; and a sharing component, configured to receive a screen content of the sink equipment via the wireless screen sharing session, and share the screen content of the sink equipment to the remote equipment according to the intersection of the display capabilities.

In an example embodiment, the sharing component is further configured to receive the screen content, sent by the sink equipment via the wireless screen sharing session, of the sink equipment, process the screen content of the sink equipment according to the intersection of the display capabilities, and send the processed screen content of the sink equipment to the remote equipment.

According to a third aspect of the embodiments of the present disclosure, a remote wireless screen sharing system is provided, which includes source equipment, including the remote wireless screen sharing device as described in item 9 or 10; sink equipment, configured to send the capability information of the sink equipment and the screen content of the sink equipment to the source equipment via the wireless screen sharing session; and remote equipment, configured to send the capability information of the remote equipment to the source equipment, and receive the screen content, processed by the source equipment according to the intersection of the display capabilities, of the sink equipment.

According to the embodiments of the present disclosure, a wireless screen sharing session is established with sink equipment and capability information of the sink equipment is acquired; a connection is established with remote equipment and capability information of the remote equipment and network information of the remote equipment are acquired; an intersection of display capabilities of the sink equipment and the remote equipment is determined according to the capability information of the sink equipment, the capability information of the remote equipment and the network information of the remote equipment. By virtue of the technical solution, the problem of poor equipment compatibility during remote wireless screen sharing is solved, and the effect of improving equipment compatibility during remote wireless screen sharing is further achieved.

BRIEF DESCRIPTION OF THE DRAWINGS

The drawings described here are adopted to provide further understanding of the present disclosure, and form a part of the present disclosure. Schematic embodiments of the present disclosure and description thereof are adopted to explain the present disclosure and not intended to form improper limits to the present disclosure. In the drawings.

DETAILED DESCRIPTION OF THE EMBODIMENTS

The present disclosure is described below with reference to the drawings and embodiments in detail. It is important to note that the embodiments in the present disclosure and characteristics in the embodiments can be combined under a condition of no conflicts.

Figure 1:
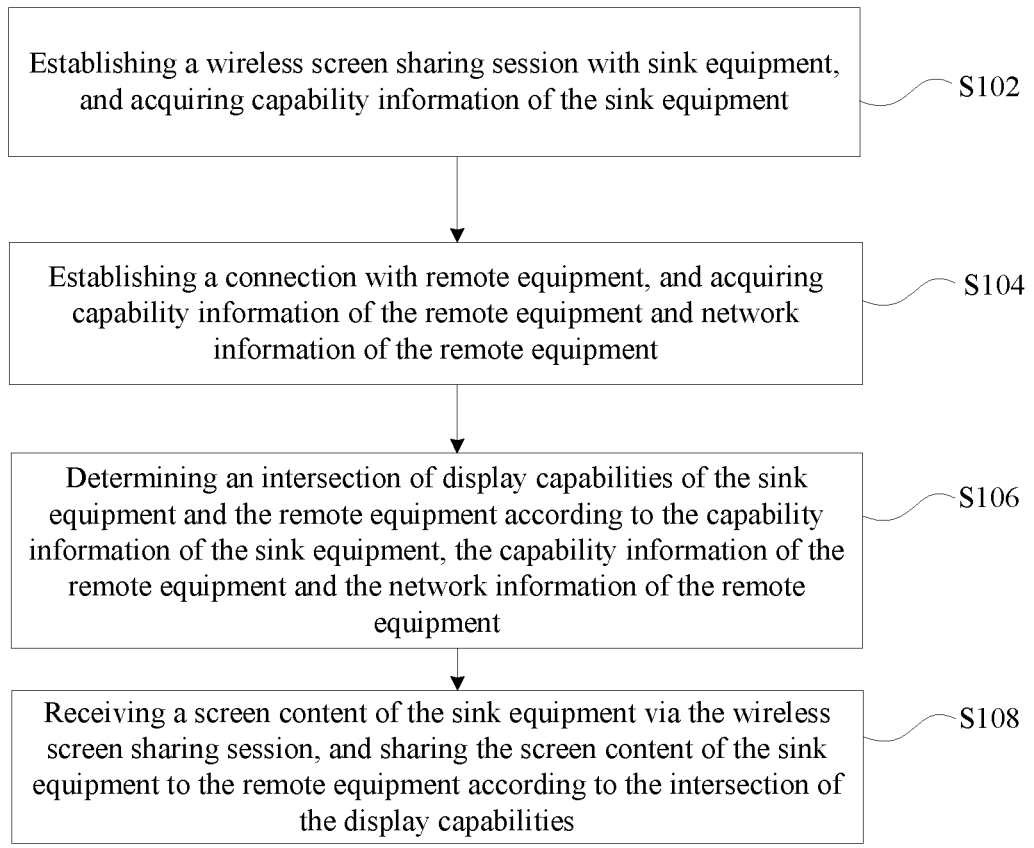
FIG. 1 is a flowchart of a remote wireless screen sharing method according to an embodiment of the present disclosure.

An embodiment of the present disclosure provides a remote wireless screen sharing method. FIG. 1 is a flowchart of a remote wireless screen sharing method according to the embodiment of the present disclosure, and as shown in FIG. 1, the method includes the following steps S102 to S108.

Step S102: a wireless screen sharing session with sink equipment is established, and capability information of the sink equipment is acquired;

Step S104: a connection with remote equipment is established, and capability information of the remote equipment and network information of the remote equipment are acquired;

Step S106: an intersection of display capabilities of the sink equipment and the remote equipment is determined according to the capability information of the sink equipment, the capability information of the remote equipment and the network information of the remote equipment; and Step S108: a screen content of the sink equipment is received via the wireless screen sharing session, and the screen content of the sink equipment is shared to the remote equipment according to the intersection of the display capabilities.

By the abovementioned steps, the problem of equipment incompatibility of wireless screen sharing and a current remote desktop is solved. During wireless screen sharing, the intersection of the display capabilities of the sink equipment and the remote equipment is determined according to the capability information of the sink equipment and the remote equipment and the network information of the remote equipment. By virtue of the technical solution, the wireless screen sharing can be extended to the remote equipment, limits to wireless screen sharing in the distance and network connection manner between two pieces of equipment can be further broken, and the screen content of the sink equipment can be simultaneously shared to third equipment, i.e. the remote equipment.

There may be multiple manners for receiving the screen content of the sink equipment via the wireless screen sharing session and sharing the screen content of the sink equipment to the remote equipment according to the intersection of the display capabilities. For example, the intersection of the display capabilities is sent to the sink equipment and the remote equipment after the intersection of the display capabilities is determined, the screen content is directly forwarded to the remote equipment after the screen content of the sink equipment is received, and the remote equipment processes and displays the received screen content according to the finally determined intersection of the display capabilities. Except the abovementioned manner, the following example manner for remote wireless screen sharing may further be adopted: the screen content, sent by the sink equipment via the wireless screen sharing session, of the sink equipment is received, the screen content of the sink equipment is processed according to the intersection of the display capabilities, and the processed screen content of the sink equipment is sent to the remote equipment.

In an example embodiment, the capability information of the sink equipment or the capability information of the remote equipment or the intersection of the display capabilities may include at least one of: video information and an audio coding format, wherein the video information may include a video coding format and/or a maximum resolution. The intersection of the display capabilities may further include, besides the abovementioned information, other information such as transmission manner information, wherein the transmission manner information refers to a protocol adopted for transmission, for example, Real-time Transmission Protocol (RTP) for transmission.

In an example embodiment, the network information may include at least one of: a network connection type and a bandwidth, wherein the network connection type includes a P2P manner, an STUN manner or a TURN manner. Of course, the network information is not limited to the abovementioned information, and for example, the network information may further include information about a transmission rate and the like. The network connection type may also include other connection manners.

There may be many ways for determining the intersection of the display capabilities, for example, the following manner may be adopted in the example embodiment. The intersection of the display capabilities of the sink equipment and the remote equipment may be determined according to the capability information of the sink equipment, the capability information of the remote equipment and the network information of the remote equipment in at least one of the following manners: under a condition that the network connection type is the P2P manner, according to the capability information of the sink equipment and the capability information of the remote equipment, an audio format of which a compression ratio is greater than a first compression ratio threshold is selected as an audio coding format of the intersection of the display capabilities and a resolution which is greater than a first resolution threshold is selected as a resolution of the intersection of the display capabilities; under a condition that the network connection type is the STUN manner, according to the capability information of the sink equipment and the capability information of the remote equipment, an audio format of which a compression ratio is smaller than the first compression ratio threshold and greater than a second compression ratio threshold is selected as the audio coding format of the intersection of the display capabilities and a resolution which is smaller than the first resolution threshold and greater than a second resolution threshold is selected as the resolution of the intersection of the display capabilities; and under a condition that the network connection type is the TURN manner, according to the capability information of the sink equipment and the capability information of the remote equipment, an audio format of which a compression ratio is smaller than the second compression ratio threshold is selected as the audio coding format of the intersection of the display capabilities and a resolution which is smaller than the second resolution threshold is selected as the resolution of the intersection of the display capabilities. In an example embodiment, the intersection of the display capabilities of the sink equipment and the remote equipment may be determined according to the capability information of the sink equipment, the capability information of the remote equipment and the network information of the remote equipment in a further manner as follows: under a condition that the bandwidth is greater than a first bandwidth threshold, a CHP is selected as a video coding format of the intersection of the display capabilities; and under a condition that the bandwidth is smaller than the first bandwidth threshold, a CBP is selected as the video coding format of the intersection of the display capabilities. By the abovementioned steps, an optimal intersection of the display capabilities may be selected, and remote wireless screen sharing may be better implemented.

In an example embodiment, the intersection of the display capabilities of the sink equipment and the remote equipment may also be determined according to the capability information of the sink equipment, the capability information of the remote equipment and the network information of the remote equipment in a manner as follows: under a condition that the capability information of the sink equipment does not intersect the capability information of the remote equipment, an intersection of display capabilities of current equipment itself and the sink equipment is acquired, and the intersection of the display capabilities of the current equipment itself and the sink equipment is employed as the intersection of the display capabilities of the sink equipment and the remote equipment. By the abovementioned steps, the problem of how to implement remote wireless screen sharing between the sink equipment and the remote equipment under a condition that there is no intersection of the display capabilities is solved.

In an example embodiment, the connection with the remote equipment may be established via XMPP in a manner as follows: an XMPP server is accessed via a first access point, wherein the first access point accesses the XMPP server via XMPP; and the connection with the remote equipment is established via the XMPP server. Of course, there may be multiple manners for establishing the connection with the remote equipment, for example, the connection may be directly established with the remote equipment, and the connection may alternatively be established with the remote equipment via multiple intermediate network elements.

In another embodiment of the present disclosure, the wireless screen sharing session is a Miracast session.

Figure 2:
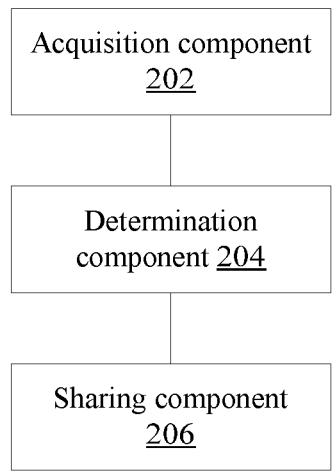
FIG. 2 is a structure diagram of a remote wireless screen sharing device according to an embodiment of the present disclosure.

An embodiment of the present disclosure further provides a remote wireless screen sharing device. FIG. 2 is a structure diagram of a remote wireless screen sharing device according to the embodiment of the present disclosure, and as shown in FIG. 2, the device includes:

an acquisition component 202, configured to establish a wireless screen sharing session with sink equipment, and acquire capability information of the sink equipment; and establish a connection with remote equipment, and acquire capability information of the remote equipment and network information of the remote equipment;

a determination component 204, configured to determine an intersection of display capabilities of the sink equipment and the remote equipment according to the capability information of the sink equipment, the capability information of the remote equipment and the network information of the remote equipment; and a sharing component 206, configured to receive a screen content of the sink equipment via the wireless screen sharing session, and share the screen content of the sink equipment to the remote equipment according to the intersection of the display capabilities.

In an example embodiment, the sharing component 206 is further configured to receive the screen content, sent by the sink equipment via the wireless screen sharing session, of the sink equipment, process the screen content of the sink equipment according to the intersection of the display capabilities, and send the processed screen content of the sink equipment to the remote equipment.

Figure 3:
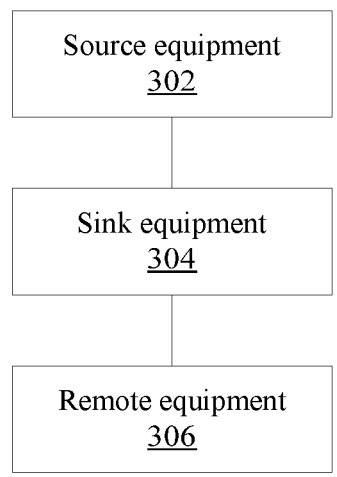
FIG. 3 is a structure diagram of a remote wireless screen sharing system according to an embodiment of the present disclosure.

An embodiment of the present disclosure further provides a remote wireless screen sharing system. FIG. 3 is a structure diagram of a remote wireless screen sharing system according to the embodiment of the present disclosure, and as shown in FIG. 3, the device includes:

source equipment 302, including the remote wireless screen sharing device provided by the previous embodiment;

sink equipment 304, configured to send the capability information of the sink equipment and the screen content of the sink equipment to the source equipment via the wireless screen sharing session; and remote equipment 306, configured to send the capability information of the remote equipment to the source equipment, and receive the screen content, processed by the source equipment according to the intersection of the display capabilities, of the sink equipment.

Example Embodiment 1

Figure 4:
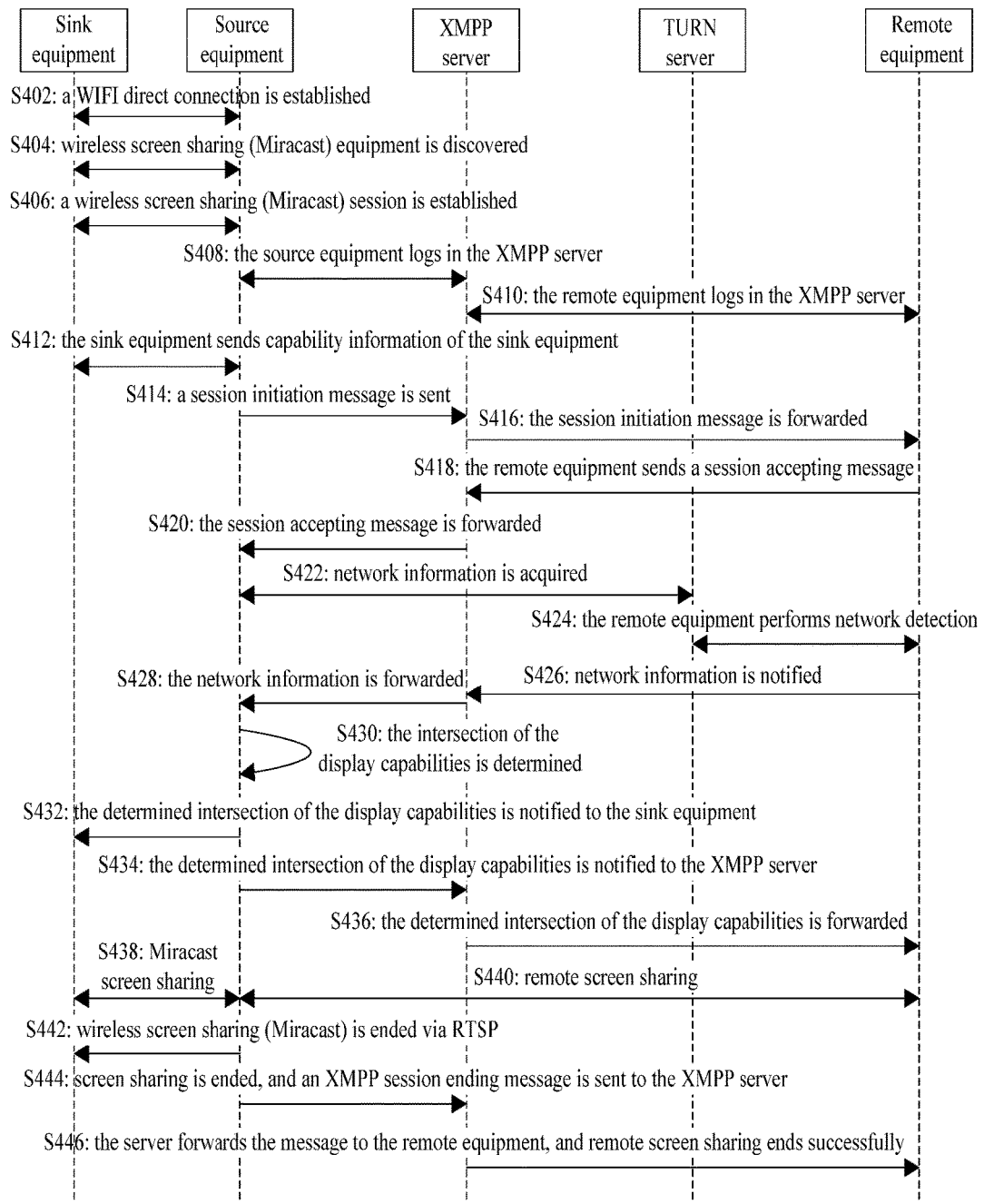
FIG. 4 is a flowchart of a remote wireless screen sharing method according to an example embodiment of the present disclosure.

FIG. 4 is a flowchart of a remote wireless screen sharing method according to an example embodiment of the present disclosure, and as shown in FIG. 4, the method includes the following steps S402 to S446.

Step S402: a WIFI direct connection is established.

Source equipment establishes a WIFI direct connection with sink equipment. In the related technology, Miracast specifies that the source equipment and the sink equipment should support WIFI direct connection.

Step S404: Miracast equipment is discovered.

The source equipment searches for compatible Miracast equipment via Link Layer Service Discovery (L2SD) protocol, and in the embodiment, the sink equipment is supposed to be the compatible Miracast equipment.

Step S406: a Miracast session is established.

The source equipment and the sink equipment establish the Miracast session by adopting Real Time Stream Protocol (RTSP) of Miracast, to get prepared for wireless screen sharing.

Step S408: the source equipment logs in an XMPP server.

In order to perform wireless screen sharing with remote equipment, the source equipment may register an account on the XMPP server and then log in the XMPP server by virtue of the registered account. The source equipment may log in the XMPP server in multiple manners, for example, the source equipment may establish a connection with an access point and then log in the XMPP server via the access point.

Step S410: the remote equipment logs in the XMPP server.

The remote equipment may log in the XMPP server by adopting the account the same as that of the source equipment. The remote equipment adopts the account the same as that of the source equipment because the XMPP server can instantly notify the remote equipment and the source equipment of presence information according to the same account. That is, after the remote equipment finishes login by adopting the account the same as that of the source equipment, the source equipment may learn about that the remote equipment has been online via a presence notice of the server. Of course, the remote equipment and the source equipment may also adopt different accounts for login as long as the accounts of the remote equipment and the source equipment are associated on the XMPP server in advance.

Step S412: the sink equipment sends capability information of the sink equipment.

The sink equipment sends the capability information of the sink equipment in Session Description Protocol (SDP) via an RTSP notification message. In an example embodiment, the capability information of the sink equipment may include video information and/or an audio coding format. In an example embodiment, the video information may include a video coding format supported by the sink equipment and information about a maximum resolution supported by the sink equipment. Of course, the capability information of the sink equipment may further include a transmission manner such as an RTP identifier, wherein, the RTP identifier represents that the transmission manner is real-time transmission, namely representing that RTP is adopted for transmission.

Step S414: a session initiation message is sent.

The source equipment sends the session initiation message to the XMPP server to request to share a screen with the remote equipment. In order to search for an optimal intersection of the display capabilities, matched with the sink equipment, of the sink equipment and the remote equipment, the source equipment contains the capability information of the sink equipment in the session initiation message, wherein the capability information of the sink equipment may include the audio coding format, the video coding format and the RTP identifier.

Step S416: the session initiation message is forwarded.

After receiving the session initiation message from the source equipment, the XMPP server confirms the session initiation message, and forwards the session initiation message to the remote equipment.

Step S418: the remote equipment sends a session accepting message.

After receiving the session initiation message from the XMPP server, the remote equipment analyzes the capability information of the sink equipment contained in the session initiation message. The remote equipment compares the capability information of the sink equipment and the capability information of the remote equipment itself to judge whether there exists an intersection therebetween. Then, the remote equipment sends the session accepting message to the XMPP, the session accepting message including the capability information of the remote equipment and an identifier indicating whether there exists the intersection or not.

Step S420: the session accepting message is forwarded.

The server receives the session accepting message from the remote equipment, confirms the session accepting message, and then forwards the session accepting message to the source equipment.

Step S422: network information is acquired.

The source equipment starts detecting a network connection with the remote equipment to acquire network information of the remote equipment. For example, the source equipment sends a detection message to a TURN server to detect the network connection between the source equipment and the remote equipment. In an example embodiment, the network information may include a network connection type and/or a bandwidth, and is adopted to finally determine the intersection of the display capabilities of the source equipment and the remote equipment, namely to finally determine resolutions of an adopted video format and audio format according to the network connection type and/or the bandwidth on the basis of the capability information of the sink equipment and the capability information of the remote equipment. In an example embodiment, there may be three main network connection types between the source equipment and the remote equipment: a P2P manner, an STUN manner and a TURN manner.

Step S424: the remote equipment performs network detection.

The remote equipment sends a detection message to the source equipment via the TURN server for the three network connection types, and if a response is received, it is determined that the network connection has been established between the remote equipment and the source equipment under a current network connection type, so that the corresponding network connection type is determined. In addition, the remote equipment may further perform uplink and downlink bandwidth estimation.

Step S426: network information is notified.

The remote equipment notifies the network information of the remote equipment to the XMPP server via an XMPP message.

Step S428: the network information is forwarded.

After receiving the network information of the remote equipment, the XMPP server confirms the message bearing the network information of the remote equipment, and forwards the message to the source equipment.

Step S430: the intersection of the display capabilities is determined.

After receiving the message, bearing the network information of the remote equipment, forwarded by the server, the source equipment obtains the network information of the remote equipment from the message, compares the network information with the network information acquired in Step S422, and determines the final network information of the remote equipment. At this time, the source equipment has acquired the capability information of the sink equipment, the capability information of the remote equipment and the network information of the remote equipment. The intersection of the display capabilities of the sink equipment and the remote equipment may be determined according to the acquired information. Of course, the capability information of the source equipment itself may further be determined in addition to the above-mentioned acquired information, thereby determining the intersection of the display capabilities of the sink equipment, the source equipment and the remote equipment.

Under a condition that the network connection type is the P2P manner, an audio format of which a compression ratio is greater than a first compression ratio threshold is selected as an audio coding format of the intersection of the display capabilities and a resolution which is greater than a first resolution threshold is selected as a resolution of the intersection of the display capabilities according to the capability information of the sink equipment and the capability information of the remote equipment; under a condition that the network connection type is the STUN manner, an audio format of which a compression ratio is smaller than the first compression ratio threshold and greater than a second compression ratio threshold is selected as the audio coding format of the intersection of the display capabilities and a resolution which is smaller than the first resolution threshold and greater than a second resolution threshold is selected as the resolution of the intersection of the display capabilities according to the capability information of the sink equipment and the capability information of the remote equipment; and under a condition that the network connection type is the TURN manner, an audio format of which a compression ratio is smaller than the second compression ratio threshold is selected as the audio coding format of the intersection of the display capabilities and a resolution which is smaller than the second resolution threshold is selected as the resolution of the intersection of the display capabilities according to the capability information of the sink equipment and the capability information of the remote equipment. For example, if the network connection type between the sink equipment and the remote equipment is the P2P manner, a video with a higher resolution may be transmitted, and an LPCM format may be selected as the audio coding format; if the network connection type is the STUN manner, a video with an intermediate resolution may be transmitted, and an AAC format may be selected as the audio coding format; if the network connection type is the TURN manner, a video with a lower resolution may be transmitted, and an AC3 format may be selected as the audio coding format; and if the capability information of the source equipment does not intersect the capability information of the remote equipment or a preset connection condition between the source equipment and the remote equipment is not met, the intersection of the display capabilities of the source equipment and the sink equipment may be employed as the intersection of the display capabilities of the remote equipment and the source equipment.

Step S432: the determined intersection of the display capabilities is notified to the sink equipment.

The source equipment notifies the finally determined intersection of the display capabilities, i.e. the intersection of equipment capabilities of the source equipment and the remote equipment, or the intersection of equipment capabilities of the source equipment, the sink equipment and the remote equipment, to the sink equipment via an RTSP notification message.

Step S434: the determined intersection of the display capabilities is notified to the XMPP server.

The source equipment notifies the determined intersection of the display capabilities, i.e. the intersection of equipment capabilities of the source equipment and the remote equipment, or the intersection of equipment capabilities of the source equipment, the sink equipment and the remote equipment, to the XMPP server via an XMPP message.

Step S436: the determined intersection of the display capabilities is forwarded.

The server confirms the XMPP message bearing the intersection of the display capabilities, and forwards the message to the remote equipment.

Step S438: Miracast screen sharing is performed.

RTP transmission between the source equipment and the sink equipment is started, that is, the Miracast session is successfully established, and Miracast screen sharing between the source equipment and the sink equipment is started.

Step S440: remote wireless screen sharing is performed.

The source equipment processes a screen content received from the sink equipment according to the determined intersection of the display capabilities, and sends the processed screen content of the sink equipment to the remote equipment via the RTP. Specifically, the source equipment performs transcoding processing on the received screen content according to the video format and/or the audio format in the intersection of the display capabilities after receiving the screen content sent by the sink equipment, and sends the transcoded screen content to the remote equipment in real time.

By the steps, wireless screen sharing is able to be extended to remote equipment at any location, and if there is other equipment in need of participating in wireless screen sharing, Step S408 to Step S440 may be repeated.

Step S442-Step S446: remote wireless screen sharing is ended.

When the source equipment intends to end wireless screen sharing, the source equipment ends the Miracast session via RTSP, and stops RTP transmission between the source equipment and the sink equipment; and the source equipment simultaneously sends a session ending message to the server via XMPP, and the server confirms the session ending message, and forwards the session ending message to the remote equipment to end remote wireless screen sharing.

Example Embodiment 2

Figure 5:
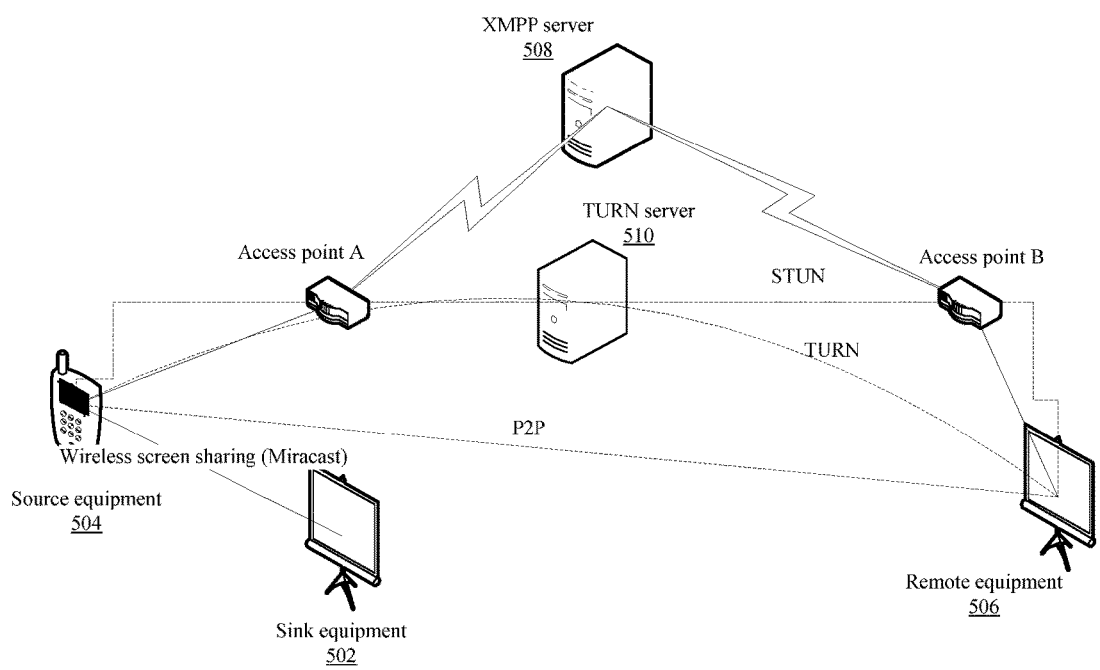
FIG. 5 is a network topology of a remote wireless screen sharing system according to an example embodiment of the present disclosure.

FIG. 5 is a network topology of a remote wireless screen sharing system according to an example embodiment of the present disclosure. As shown in FIG. 5, the system includes sink equipment 502, source equipment 504, remote equipment 506, an access point A, an access point B, an XMPP server 508 and a TURN server 510.

The source equipment 504 and the sink equipment 502 have WIFI direct connection capability, and can perform Miracast screen sharing. The source equipment 504 accesses the XMPP server 508 via the access point A, and the remote equipment 506 is connected with the XMPP server 508 via the access point B. The source equipment 504 acquires capability information of the sink equipment and capability information of the remote equipment after establishing connections with the sink equipment 502 and the remote equipment 508 respectively. In an example embodiment, the capability information of the sink equipment and/or the capability information of the remote equipment may include at least one of: video information and audio format information. In an example embodiment, the video information includes a resolution and/or a video coding format. The source equipment 504 and the sink equipment 502 discover each other via L2SD protocol, and the source equipment 504 and the remote equipment 506 may discover each other by virtue of presence information when different equipment logs in the server with the same account.

The remote equipment 506 may be located in the same local area network with the sink equipment 502, and may also be located in an Internet Protocol (IP) address and port constrained network, and under the latter condition, the system may further include the TURN server 510 for assisting in detecting a network connection type of the source equipment 504 and the remote equipment 506.

There are three main connection network types between the source equipment 504 and the remote equipment 506: a P2P manner, an STUN manner and a TURN manner. In an example embodiment, under the P2P manner, the source equipment 504 and the remote equipment 506 may directly perform transmission therebetween, and they are located in a local area network of the same network segment; under the STUN manner, the source equipment 504 and the remote equipment 506 are located in local area networks of different network segments, and there is no firewall forming limits to IP addresses and ports therebetween; and under the TURN manner, the source equipment 504 and the remote equipment 506 are located in IP address and port constrained networks respectively, and transmission therebetween requires the TURN server 510.

After obtaining the capability information of the sink equipment and the capability information of the remote equipment, the source equipment 504 determines a final intersection of the display capabilities, e.g., a finally selected resolution, video coding format and audio and video coding format, in combination with the network connection type between the source equipment 504 and the remote equipment 506. Miracast supports video resolutions ranged from 640*360 to 1920*1080, and also supports multiple audio coding formats and video coding formats, which is related to a network connection manner of WIFI direct connection, so that the source equipment 504 needs to detect the network connection type and/or the bandwidth between the source equipment 504 and the remote equipment 506 when establishing remote wireless screen sharing with the remote equipment 506, and finally determines the intersection of the display capabilities of the source equipment 504 and the remote equipment 506 according to the network connection type and/or the bandwidth as well as the capability information of the source equipment and the capability information of the remote equipment. The intersection of the display capabilities may include the video information and the audio coding format, wherein the video information includes the resolution and/or the video coding format.

The source equipment 504 notifies the sink equipment 502 and the remote equipment 506 via their own session negotiation protocols respectively, thereby implementing remote wireless screen sharing.

From the above, it can be seen that the embodiments of the present disclosure achieve the following technical effect: equipment compatibility during remote wireless screen sharing is improved.

Obviously, those skilled in the art should know that each component or step of the present disclosure may be implemented by a universal computing device, and the components or steps can be concentrated on a single computing device or distributed on a network formed by a plurality of computing devices, and may optionally be implemented by programmable codes executable for the computing devices, so that the components or steps may be stored in a storage device for execution with the computing devices, or the shown or described steps may be executed in a sequence different from the sequence here under a certain condition, or the components or steps may form each integrated circuit component, or multiple components or steps therein may form a single integrated circuit component for implementation. As a consequence, the present disclosure is not limited to any specific hardware and software combination.

The above is only the example embodiment of the present disclosure and not intended to limit the present disclosure, and for those skilled in the art, the present disclosure may have various modifications and variations. Any modifications, equivalent replacements, improvements and the like within the principle of the present disclosure shall fall within the scope of protection defined by the claims of the present disclosure.

What is claimed is:

1. A remote wireless screen sharing method, comprising:
    establishing a wireless screen sharing session with sink equipment, and acquiring capability information of the sink equipment;
    establishing a connection with remote equipment, and acquiring capability information of the remote equipment and network information of the remote equipment;
    determining an intersection of display capabilities of the sink equipment and the remote equipment according to the capability information of the sink equipment, the capability information of the remote equipment and the network information of the remote equipment; and
    receiving a screen content of the sink equipment via the wireless screen sharing session, and sharing the screen content of the sink equipment to the remote equipment according to the intersection of the display capabilities;
    wherein the network information comprises at least one of: a network connection type and a bandwidth, wherein the network connection type comprises a Session Traversal Utilities for Network Address Translation (STUN) manner or a Traversal using Relay NAT (TURN) manner;
    wherein determining the intersection of the display capabilities of the sink equipment and the remote equipment according to the capability information of the sink equipment, the capability information of the remote equipment and the network information of the remote equipment comprises at least one of the following:
    under a condition that the network connection type is the STUN manner, selecting an audio format of which a compression ratio is smaller than the first compression ratio threshold and greater than a second compression ratio threshold as the audio coding format of the intersection of the display capabilities and selecting a resolution which is smaller than the first resolution threshold and greater than a second resolution threshold as the resolution of the intersection of the display capabilities according to the capability information of the sink equipment and the capability information of the remote equipment; and
    under a condition that the network connection type is the TURN manner, selecting an audio format of which a compression ratio is smaller than the second compression ratio threshold as the audio coding format of the intersection of the display capabilities and selecting a resolution which is smaller than the second resolution threshold as the resolution of the intersection of the display capabilities according to the capability information of the sink equipment and the capability information of the remote equipment.

2. The method as claimed in claim 1, wherein receiving the screen content of the sink equipment via the wireless screen sharing session, and sharing the screen content of the sink equipment to the remote equipment according to the intersection of the display capabilities comprises:
    receiving the screen content, sent by the sink equipment via the wireless screen sharing session, of the sink equipment; and
    processing the screen content of the sink equipment according to the intersection of the display capabilities, and sending the processed screen content of the sink equipment to the remote equipment.

3. The method as claimed in claim 2, wherein the wireless screen sharing session is a Miracast session.

4. The method as claimed in claim 1, wherein the capability information of the sink equipment or the capability information of the remote equipment or the intersection of the display capabilities comprises at least one of: video information and an audio coding format, wherein the video information comprises a video coding format and/or a maximum resolution.

5. The method as claimed in claim 4, wherein the wireless screen sharing session is a Miracast session.

6. The method as claimed in claim 1, wherein the network connection type comprises a Peer-to-Peer connection (P2P) manner.

7. The method as claimed in claim 6, wherein determining the intersection of the display capabilities of the sink equipment and the remote equipment according to the capability information of the sink equipment, the capability information of the remote equipment and the network information of the remote equipment comprises at least one of the following:
    under a condition that the network connection type is the P2P manner, selecting an audio format of which a compression ratio is greater than a first compression ratio threshold as an audio coding format of the intersection of the display capabilities and selecting a resolution which is greater than a first resolution threshold as a resolution of the intersection of the display capabilities according to the capability information of the sink equipment and the capability information of the remote equipment.

8. The method as claimed in claim 7, wherein determining the intersection of the display capabilities of the sink equipment and the remote equipment according to the capability information of the sink equipment, the capability information of the remote equipment and the network information of the remote equipment further comprises at least one of the following:
    under a condition that the bandwidth is greater than a first bandwidth threshold, selecting a Constrained High Profile (CHP) as a video coding format of the intersection of the display capabilities; and
    under a condition that the bandwidth is smaller than the first bandwidth threshold, selecting a Constrained Baseline Profile (CBP) as the video coding format of the intersection of the display capabilities.

9. The method as claimed in claim 8, wherein the wireless screen sharing session is a Miracast session.

10. The method as claimed in claim 7, wherein the wireless screen sharing session is a Miracast session.

11. The method as claimed in claim 6, wherein the wireless screen sharing session is a Miracast session.

12. The method as claimed in claim 1, wherein determining the intersection of the display capabilities of the sink equipment and the remote equipment according to the capability information of the sink equipment, the capability information of the remote equipment and the network information of the remote equipment comprises: under a condition that the capability information of the sink equipment does not intersect the capability information of the remote equipment, acquiring an intersection of display capabilities of current equipment itself and the sink equipment, and employing the intersection of the display capabilities of the current equipment itself and the sink equipment as the intersection of the display capabilities of the sink equipment and the remote equipment.

13. The method as claimed in claim 12, wherein the wireless screen sharing session is a Miracast session.

14. The method as claimed in claim 1, wherein establishing the connection with the remote equipment via Extensible Messaging and Presence Protocol (XMPP) comprises:
accessing an XMPP server via a first access point, wherein the first access point accesses the XMPP server via XMPP; and
establishing the connection with the remote equipment via the XMPP server.

15. The method as claimed in claim 14, wherein the wireless screen sharing session is a Miracast session.

16. The method as claimed in claim 1, wherein the wireless screen sharing session is a Miracast session.

17. A remote wireless screen sharing device, comprising:
an acquisition component, configured to establish a wireless screen sharing session with sink equipment, and acquire capability information of the sink equipment; and establish a connection with remote equipment, and acquire capability information of the remote equipment and network information of the remote equipment;
a determination component, configured to determine an intersection of display capabilities of the sink equipment and the remote equipment according to the capability information of the sink equipment, the capability information of the remote equipment and the network information of the remote equipment; and
a sharing component, configured to receive a screen content of the sink equipment via the wireless screen sharing session, and share the screen content of the sink equipment to the remote equipment according to the intersection of the display capabilities;
wherein the network information comprises at least one of: a network connection type and a bandwidth, wherein the network connection type comprises a Session Traversal Utilities for Network Address Translation (STUN) manner or a Traversal using Relay NAT (TURN) manner;
wherein determining the intersection of the display capabilities of the sink equipment and the remote equipment according to the capability information of the sink equipment, the capability information of the remote equipment and the network information of the remote equipment comprises at least one of the following:
under a condition that the network connection type is the STUN manner, selecting an audio format of which a compression ratio is smaller than the first compression ratio threshold and greater than a second compression ratio threshold as the audio coding format of the intersection of the display capabilities and selecting a resolution which is smaller than the first resolution threshold and greater than a second resolution threshold as the resolution of the intersection of the display capabilities according to the capability information of the sink equipment and the capability information of the remote equipment; and
under a condition that the network connection type is the TURN manner, selecting an audio format of which a compression ratio is smaller than the second compression ratio threshold as the audio coding format of the intersection of the display capabilities and selecting a resolution which is smaller than the second resolution threshold as the resolution of the intersection of the display capabilities according to the capability information of the sink equipment and the capability information of the remote equipment.

18. The device as claimed in claim 17, wherein the sharing component is further configured to receive the screen content, sent by the sink equipment via the wireless screen sharing session, of the sink equipment, process the screen content of the sink equipment according to the intersection of the display capabilities, and send the processed screen content of the sink equipment to the remote equipment.

19. A remote wireless screen sharing system, comprising:
source equipment, comprising the remote wireless screen sharing device as claimed in claim 17;
sink equipment, configured to send the capability information of the sink equipment and the screen content of the sink equipment to the source equipment via the wireless screen sharing session; and
remote equipment, configured to send the capability information of the remote equipment to the source equipment, and receive the screen content, processed by the source equipment according to the intersection of the display capabilities, of the sink equipment.

20. A remote wireless screen sharing system, comprising:
source equipment, comprising the remote wireless screen sharing device as claimed in claim 18;
sink equipment, configured to send the capability information of the sink equipment and the screen content of the sink equipment to the source equipment via the wireless screen sharing session; and
remote equipment, configured to send the capability information of the remote equipment to the source equipment, and receive the screen content, processed by the source equipment according to the intersection of the display capabilities, of the sink equipment.

* * * * *